United States Patent
Gotoh et al.

(10) Patent No.: US 7,286,926 B2
(45) Date of Patent: Oct. 23, 2007

(54) APPARATUS AND METHOD FOR DETECTING DETERIORATION OF EXHAUST GAS SENSOR

(75) Inventors: Yoshiyuki Gotoh, Nagoya (JP); Hisashi Iida, Kariya (JP); Hiroshi Tashiro, Obu (JP)

(73) Assignee: Denso Corporation, Kariya, Aichi-pref (JP)

( * ) Notice: Subject to any disclaimer, the term of this patent is extended or adjusted under 35 U.S.C. 154(b) by 0 days.

(21) Appl. No.: 11/480,538

(22) Filed: Jul. 5, 2006

(65) Prior Publication Data

US 2007/0010932 A1    Jan. 11, 2007

(30) Foreign Application Priority Data

Jul. 5, 2005    (JP)    ............................. 2005-195633

(51) Int. Cl.
G06F 19/00    (2006.01)
F02D 41/14    (2006.01)
G01N 27/26    (2006.01)

(52) U.S. Cl. ...................... 701/114; 701/109; 123/688; 73/23.32; 204/401

(58) Field of Classification Search ................ 701/114, 701/103, 109, 108; 60/276, 284; 204/424, 204/425, 426, 401; 123/688; 73/1.06, 118.1, 73/23.32

See application file for complete search history.

(56) References Cited

U.S. PATENT DOCUMENTS

| 6,034,610 A | 3/2000 | Schnaibel et al. .......... 340/635 |
| 2004/0000493 A1* | 1/2004 | Yasui et al. ................. 205/775 |
| 2004/0089060 A1* | 5/2004 | Suzuki ....................... 73/118.1 |
| 2006/0047468 A1* | 3/2006 | Aoki .......................... 702/132 |

* cited by examiner

*Primary Examiner*—Stephen K. Cronin
*Assistant Examiner*—Johnny H. Hoang
(74) *Attorney, Agent, or Firm*—Nixon & Vanderhye P.C.

(57) ABSTRACT

A deterioration detecting apparatus for an exhaust gas sensor of an internal combustion engine, the exhaust gas sensor including a sensor element and a heater that heats the sensor element, computes a first sensor characteristic parameter, which is related to a characteristic of the sensor element, by estimating an interchange state of thermal energy between the sensor element and a periphery of the sensor element. The deterioration detecting apparatus senses impedance of the sensor element. The deterioration detecting apparatus computes a second sensor characteristic parameter, which is related to the characteristic of the sensor element, based on the sensed impedance. The deterioration detecting apparatus determines a degree of deterioration of the exhaust gas sensor by comparing the first sensor characteristic parameter and the second sensor characteristic parameter.

24 Claims, 5 Drawing Sheets

APPARATUS AND METHOD FOR DETECTING DETERIORATION OF EXHAUST GAS SENSOR

CROSS REFERENCE TO RELATED APPLICATION

This application is based on and incorporates herein by reference Japanese Patent Application No. 2005-195633 filed on Jul. 5, 2005.

BACKGROUND OF THE INVENTION

1. Field of the Invention

The present invention relates to a deterioration detecting apparatus for an exhaust gas sensor, the deterioration detecting apparatus diagnosing deterioration of the exhaust gas sensor, which is provided with a heater for heating a sensor element.

2. Description of Related Art

A recent vehicle is provided with an exhaust gas sensor (e.g., an air-fuel sensor, an oxygen sensor) on an exhaust gas pipe such that a feedback control of the air-fuel ratio is performed based on an output of the exhaust gas sensor in order to effectively purify exhaust gas by use of a catalyst. The exhaust gas sensor may not accurately sense the air-fuel ratio in a state where a temperature of the sensor element is equal to or less than an activation temperature. Therefore, the exhaust gas sensor includes the heater that heats the sensor element such that the temperature of the sensor element is increased to an activation temperature range by use of the heater.

Deterioration of the exhaust gas sensor may degrade of a degree of accuracy in detection performance of the exhaust gas sensor so that this may degrade efficiency in purifying the exhaust gas. Thus, some exhaust gas sensors are provided with a deterioration diagnosis function. For example, Japanese Unexamined Patent Publication No. H11-83791 (corresponding to U.S. Pat. No. 603,410) P.2 to P3 discloses a deterioration diagnosis method for the exhaust gas sensor, in which impedance (internal resistance) of the sensor element of the exhaust gas sensor is measured and the deterioration of the exhaust gas sensor is determined when the measured value of the impedance exceeds a target value (deterioration determining value). In Japanese Unexamined Patent Publication No. H11-83791, the target value (deterioration determining value) is set in consideration of that the impedance of the sensor element changes relative to the temperature of the sensor element. Specifically, the target value is set by estimating the impedance as well as the temperature of the sensor element based on power consumption and a temperature of the exhaust gas detected by a temperature sensor.

In the deterioration diagnosis method for the exhaust gas sensor in the above Japanese Unexamined Patent Publication No. H11-83791, it is determined only whether the deterioration is present or not based on a comparison between the measure value of the impedance of the sensor element and the target value (deterioration determining value). Thus, an actual progressing degree of the deterioration is disadvantageously not detected.

Also, in general, the impedance (temperature) of the sensor element changes correspondingly to external heat emission emitted by the sensor element in addition to heat absorption (an exhaust gas temperature, the power consumption of the heater) by the sensor element. However, in the deterioration diagnosis method in Japanese Unexamined Patent Publication No. H11-83791, the impedance (temperature) of the sensor element is estimated solely based on the heat absorption (the exhaust gas temperature, the power consumption of the heater). Therefore, a degree of accuracy in estimation may disadvantageously become low and also a degree of accuracy in diagnosing the deterioration may disadvantageously become low.

SUMMARY OF THE INVENTION

The present invention is made in view of the above disadvantages. Thus, it is an objective of the present invention to address at least one of the above disadvantages.

To achieve the objective of the present invention, there is provided a deterioration detecting apparatus for an exhaust gas sensor of an internal combustion engine, the exhaust gas sensor including a sensor element and a heater that heats the sensor element. The deterioration detecting apparatus includes a first parameter computing means, an element impedance sensing means, a second parameter computing means and a sensor deterioration determining means. The first parameter computing means computes a first sensor characteristic parameter, which is related to a characteristic of the sensor element, by estimating an interchange state of thermal energy between the sensor element and a periphery of the sensor element. The element impedance sensing means senses impedance of the sensor element. The second parameter computing means computes a second sensor characteristic parameter, which is related to the characteristic of the sensor element, based on the impedance sensed by the element impedance sensing means. The sensor deterioration determining means determines a degree of deterioration of the exhaust gas sensor by comparing the first sensor characteristic parameter and the second sensor characteristic parameter.

To achieve the objective of the present invention, there is also provided a detecting method for detecting deterioration of an exhaust gas sensor of an internal combustion engine, the exhaust gas sensor including a sensor element and a heater that heats the sensor element. According to the method, a first sensor characteristic parameter, which is related to a characteristic of the sensor element, is computed by estimating an interchange state of thermal energy between the sensor element and a periphery of the sensor element. Impedance of the sensor element is sensed. A second sensor characteristic parameter, which is related to the characteristic of the sensor element, is computed based on the impedance sensed by the sensing of the impedance. A degree of deterioration of the exhaust gas sensor is determined by comparing the first sensor characteristic parameter and the second sensor characteristic parameter.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PREFERRED EMBODIMENTS

An embodiment that embodies a best mode for carrying out the present invention will be described.

Figure 1:
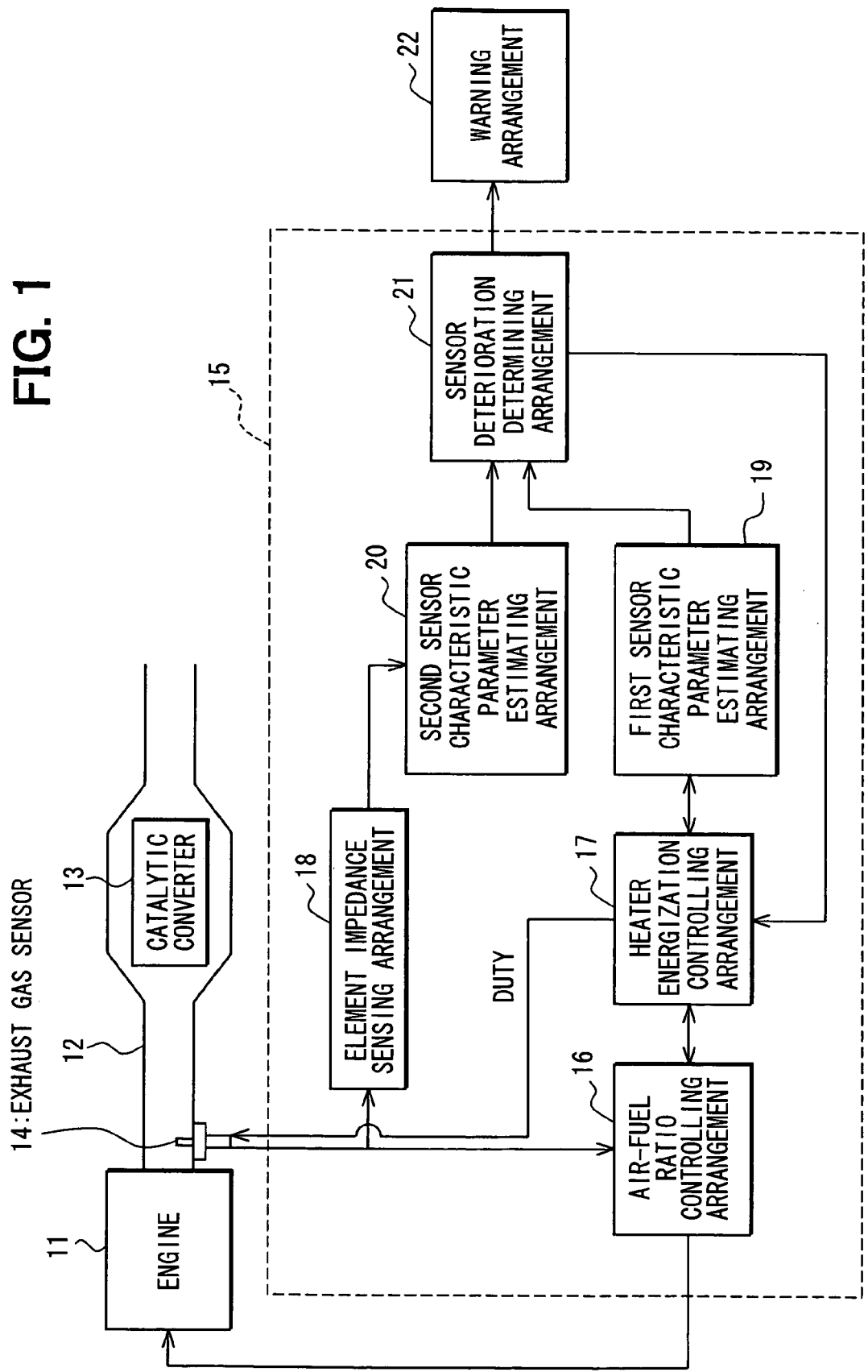
FIG. 1 is a block diagram showing functions of an entire system according to an embodiment of the present invention.

Firstly, a schematic structure of an entire system will be described. As shown in FIG. 1, an exhaust gas pipe 12 of an engine 11, which is an internal combustion engine, is provided with a catalytic converter 13, such as a three-way catalytic converter that reduces CO, HC and NOx in exhaust gas. An exhaust gas sensor 14, such as an oxygen sensor and an air-fuel sensor (A/F sensor), is provided on an upper stream side of the catalytic converter 13 for sensing one of a concentration of a gas component, an air-fuel ratio and an air-fuel mixture condition (rich or lean). Here, the concentration of the gas component includes an oxygen concentration in the exhaust gas. The exhaust gas sensor 14 includes a sensor element 26 (see FIG. 3), which is, for example, structured in such a manner that electrodes 28 adhere both sides of a zirconia solid electrolyte 27 for obtaining an output. Because an activation temperature for activating the sensor element 26 is high (about 600 to 700° C.), it is difficult to early activate the sensor element 26 by use of only heat from the exhaust gas after the engine is started. Thus, the exhaust gas sensor 14 includes a heater (not shown) for heating the sensor element 26 such that the sensor element 26 can be early activated by use of the heat from the heater.

A control device 15, which controls the engine 11, includes a function of an air-fuel ratio controlling arrangement (air-fuel ratio controlling means) 16 that reads the output from the exhaust gas sensor 14 during an engine operation and controls a fuel injection quantity by a feedback control such that the air-fuel ratio converges on a target air-fuel ratio. Also, the control device 15 includes a function of a heater energization controlling arrangement (heater energization controlling means) 17 that controls a duty ratio (DUTY) of the heater such that a temperature of the sensor element 26 of the exhaust gas sensor 14 is kept in a range of the activation temperature.

Figure 2:
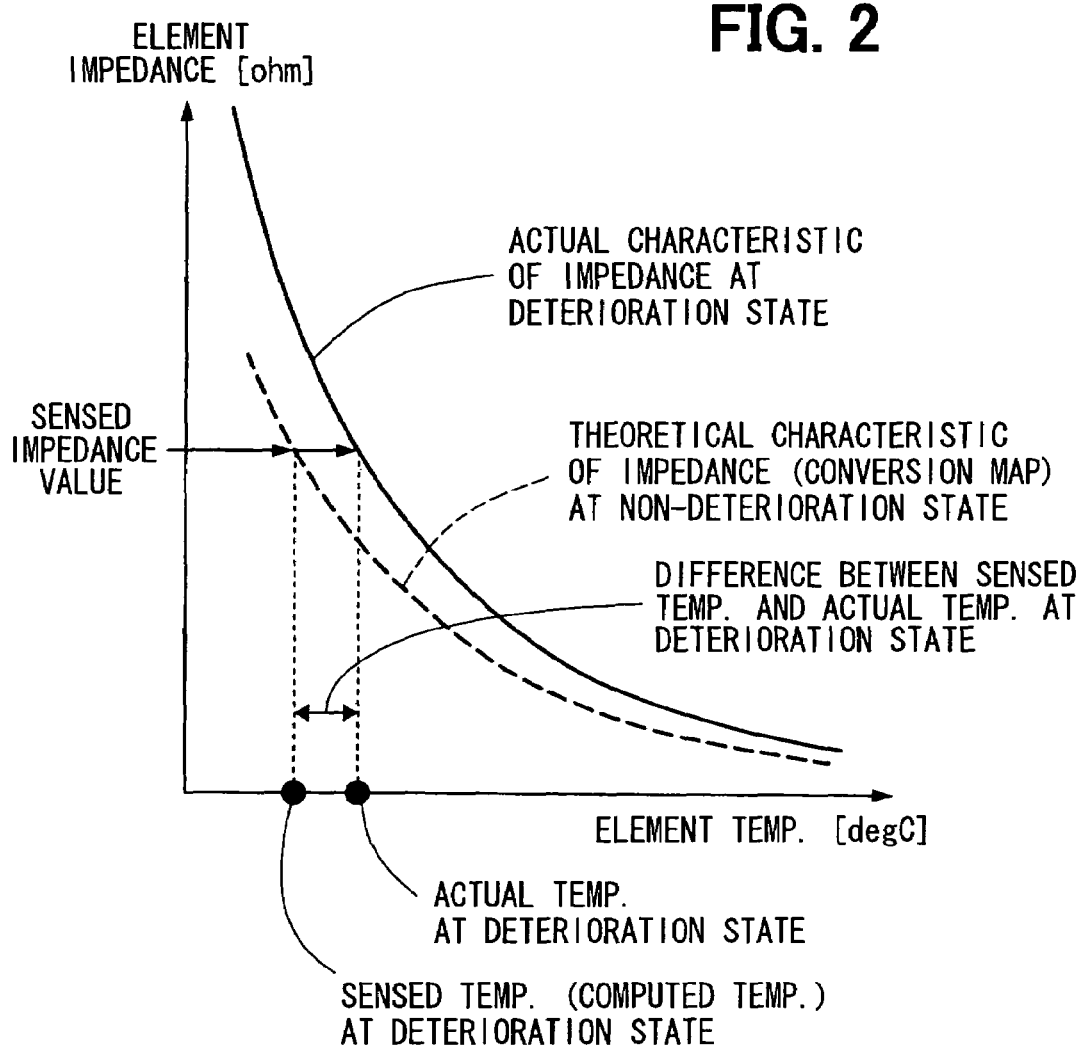
FIG. 2 is a diagram showing a characteristic of element impedance at a non-deterioration state and a deterioration state of an exhaust gas sensor.

As shown in FIG. 2, impedance of the sensor element 26 of the exhaust gas sensor 14 (hereinafter, indicated as "element impedance") depends on the temperature of the sensor element 26, and is characterized in that the element impedance decreases when the temperature of the sensor element 26 increases. Thus, the control device 15 includes a function of an element impedance sensing arrangement (element impedance sensing means) 18 that senses the element impedance.

Figure 3:
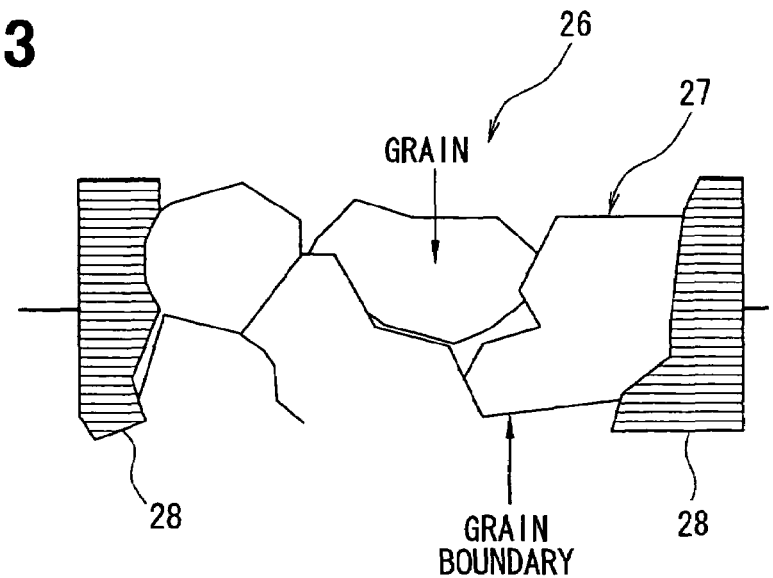
FIG. 3 is a diagram showing a structure of a sensor element.
Figure 4:
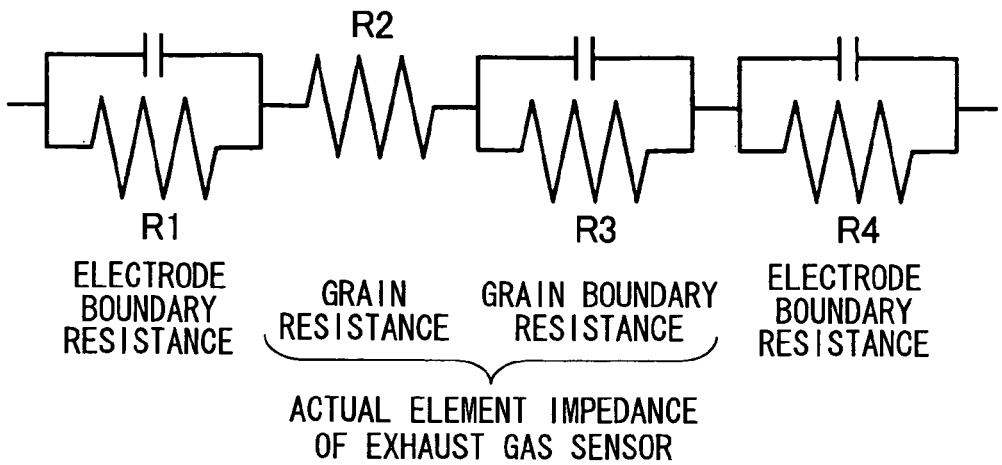
FIG. 4 is a circuit showing an equivalent circuit of the sensor element.
Figure 5:
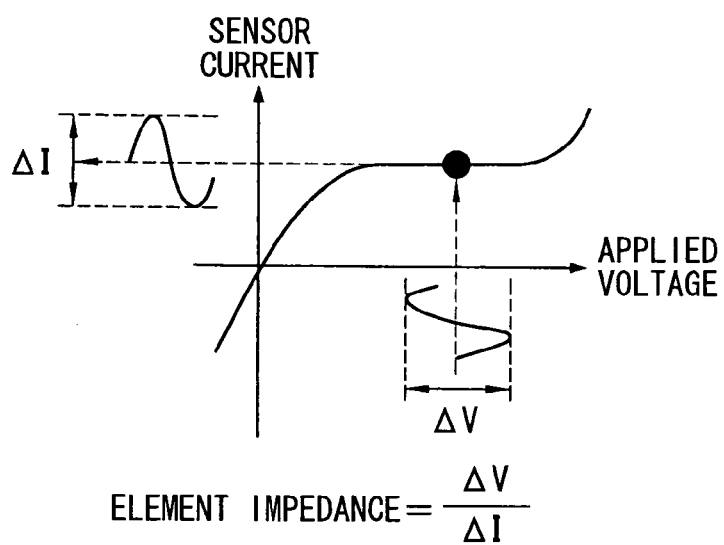
FIG. 5 is a diagram explaining a sensing method for sensing the element impedance.

As shown in FIG. 3, the sensor element 26 of the exhaust gas sensor 14 is structured such that the output is generated by adhering the electrodes 28 to the zirconia solid electrolyte 27. Typically in this structure as shown in FIG. 4, when a direct current (direct voltage) is applied to the sensor element 26 to sense the element impedance, an accurate element impedance (i.e., a grain resistance R2 and a grain boundary resistance R3 exclusively) cannot be detected because resistances R1, R4 of each boundary surface between each electrode 28 and the zirconia solid electrolyte 27 are also detected in addition to the grain resistance R2 and the grain boundary resistance R3. Therefore, in consideration of a capacitor component, which exists in parallel with each of the resistors (see FIG. 4), the element impedance sensing arrangement 18 of the present invention applies an alternating current (alternating voltage) of a predetermined frequency to the sensor element 26. Therefore, the element impedance sensing arrangement 18 senses a net element impedance (the grain resistance R2 and the grain boundary resistance R3) of the zirconia solid electrolyte 27, which is not influenced by the resistances R1, R4 of boundary surfaces, can be sensed by the following equation (see FIG. 5).

$$\text{Element Impedance} = \Delta V/\Delta I$$

Here, the $\Delta V$ is a change of the voltage and the $\Delta I$ is a change of the current.

Also, the control device 15 includes the functions of the first sensor characteristic parameter estimating arrangement (a first parameter computing means) 19, a second sensor characteristic parameter estimating arrangement (a second parameter computing means) 20 and a sensor deterioration determining arrangement (sensor deterioration determining means) 21. The first sensor characteristic parameter estimating arrangement 19 computes a parameter (hereinafter indicated as "a first sensor characteristic parameter"), which relates to a characteristic of the sensor element 26, by estimating an interchange state of thermal energy (both heat absorption and heat emission) between the sensor element 26 and a periphery thereof. The second sensor characteristic parameter estimating arrangement 20 computes a parameter (hereinafter indicated as "a second sensor characteristic parameter"), which relates to the characteristic of the sensor element 26, based on the element impedance sensed by the element impedance sensing arrangement 18. The sensor deterioration determining arrangement 21 determines a degree of deterioration of the exhaust gas sensor 14 based on a comparison between the first and second sensor characteristic parameters. The control device 15 also includes a warning arrangement (warning means) 22, which gives a warning when the degree of the deterioration of the exhaust gas sensor 14, which is based on the determination result of the sensor deterioration determining arrangement 21, is equal to or larger than a deterioration determining value. A function of each arrangement will be specifically described as follows.

The first sensor characteristic parameter estimating arrangement 19 is provided with an element temperature estimating model that computes a first element temperature parameter Pf as the first sensor characteristic parameter by estimating the interchange state of the thermal energy (both the heat absorption and the heat emission) between the sensor element 26 and the periphery thereof. Here, the first element temperature parameter Pf corresponds to a temperature Tu of the sensor element 26 (hereinafter, indicated as "an element temperature"). The element temperature estimating model considers the following three conditions in estimating the thermal interchange state, such as (1) heat absorption from the exhaust gas to the sensor element 26, (2) heat emission from the sensor element to an outdoor air, and (3) heating the sensor element by the heater (heat absorption from the heater to the sensor element 26).

$$\text{Heat Absorption from Exhaust Gas} = A \cdot Re^m \cdot (Te - Tu) \quad \text{Condition (1)}$$

A: a coefficient of a heat transfer for the exhaust gas
Te: an exhaust gas temperature
Tu: the element temperature
Re: Reynolds number
m: an exponent $$\text{Heat Emission to Outdoor Air} = B(Tu - Ta) \quad \text{Condition (2)}$$

B: a coefficient of heat transfer of the outdoor gas
Tu: the element temperature
Ta: an outdoor temperature $$\text{Heating by Heater} = I^2 \cdot R \quad \text{Condition (3)}$$

I: Heater Current
R: Heater Resistance

The element temperature estimating model is described by the following equation in consideration of the above interchange (emission and absorption) of the thermal energy.

$$cM \times dTu/dt = [\text{Heat Absorption from Exhaust Gas}] -$$
$$[\text{Heat Emission to Outdoor Air}] +$$
$$[\text{Heating by Heater}]$$
$$= A \cdot Re^m \cdot (Te - Tu) - B(Tu - Ta) + I^2 \cdot R$$

Here, cM is a heat capacity of the sensor element 26, and dTu/dt is a time differentiation value of the element temperature Tu.

A possible heat emission state of the sensor element 26 may include heat emission to a peripheral member, such as the exhaust gas pipe 12, in addition to the heat emission to the outdoor air.

The first sensor characteristic parameter estimating arrangement 19 computes the element temperature Tu based on the above element temperature estimating model and defines the computed element temperature Tu as the first element temperature parameter Pf (the first sensor characteristic parameter).

Figure 6:
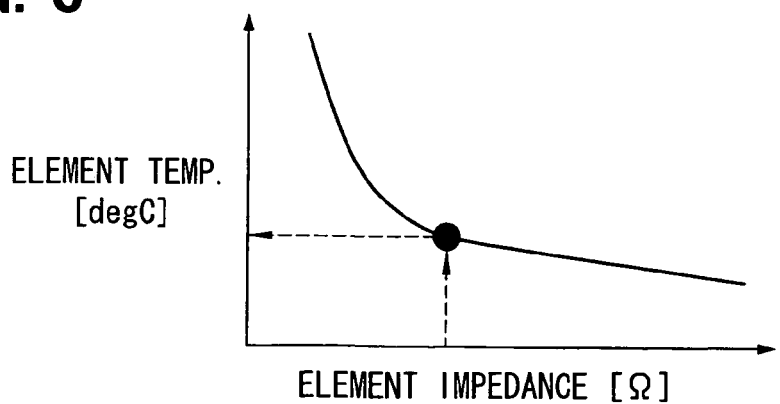
FIG. 6 is a diagram of a conversion map for converting the element impedance to an element temperature.

In contrast, the second sensor characteristic parameter estimating arrangement 20 computes the element temperature Tu based on the element impedance sensed by the element impedance sensing arrangement 18 in view of a conversion map that converts the element impedance to the element temperature shown in FIG. 6, and defines the thus computed element temperature Tu as the second element temperature parameter Pc (the second sensor characteristic parameter).

The sensor deterioration determining arrangement 21 computes a degree D of the deterioration of the exhaust gas sensor 14 based on a difference |Pf−Pc| between the first element temperature parameter Pf and the second element temperature parameter Pc. When the difference |Pf−Pc| is equal to or larger than a deterioration determining value Ps, the warning arrangement 22 indicates the warning. The warning arrangement 22 includes a warning lamp or a warning indicator provided to an instrument panel for a driver.

Further, the sensor deterioration determining arrangement 21 includes a function of a heater energization correcting means, which reduces the heater current (the duty rate DUTY) to correct the heater current (energizing amount for energizing the heater) correspondingly to the degree D of the deterioration of the exhaust gas sensor 14.

Figure 7:
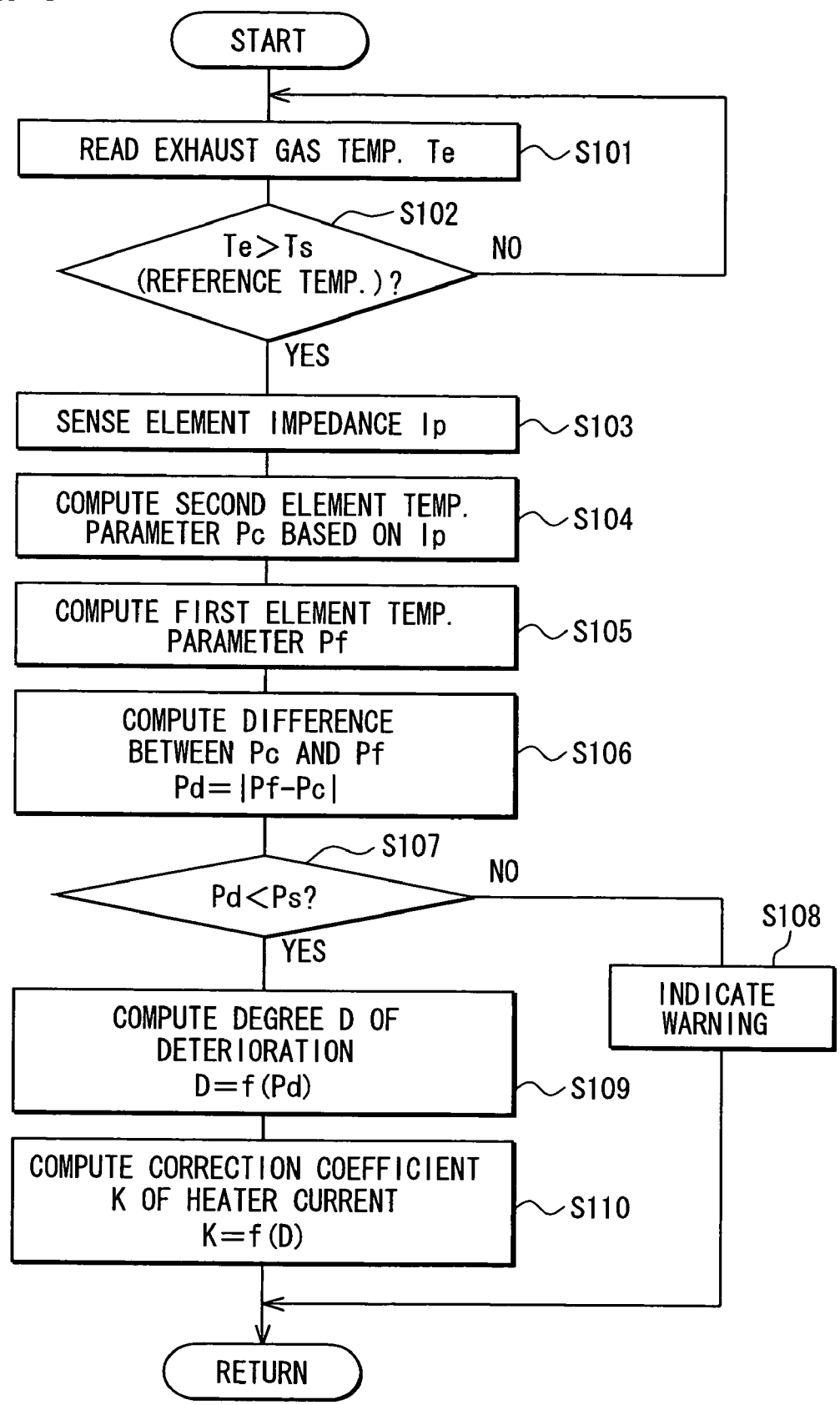
FIG. 7 is a flowchart showing a process of a deterioration detecting program for the exhaust gas sensor.

The above deterioration determining process of the exhaust gas sensor 14 is executed by a deterioration determining program for the exhaust gas sensor shown in FIG. 7. When the present program is started, the exhaust gas temperature Te sensed by a temperature sensor for the exhaust gas is read at step S101. The exhaust gas temperature Te may be alternatively estimated by use of various sensor information sets and control information sets for an engine control. Then, at step S102, the exhaust gas temperature Te is compared with a reference temperature Ts. When the exhaust gas temperature Te is equal to or less than the reference temperature Ts, it is determined that the thermal energy around the sensor element 26 is not stabilized and the process is returned to step S101 after a predetermined time to repeat the above process.

When the exhaust gas temperature Te exceeds the reference temperature Ts, it is determined that the thermal energy around the sensor element 26 is stabilized and the process proceeds to step S103. At step S103, the element impedance Ip is sensed by the element impedance sensing arrangement 18. At step S104, the second element temperature parameter Pc is computed based on the element impedance Ip in view of the conversion map shown in FIG. 6, which converts the element impedance to the element temperature.

At step S105, the first element temperature parameter Pf is computed by use of the element temperature estimating model that is based on the interchange state of the thermal energy (both the heat absorption and the heat emission) between the sensor element 26 and the periphery thereof. Then, at step S106, the difference Pd between the first element temperature parameter Pf and the second element temperature parameter Pc is computed.

$$Pd = |Pf - Pc|$$

Alternatively, a time integral value of the difference |Pf−Pc| may be computed as Pd'. It should be noted that when the time integral value Pd' of the difference Pd is used in place of the difference Pd, related value Ps, equation f(Pd) and map, which relate to the Pd in the following computation, are correspondingly changed to an alternative value Ps', an alternative function f'(Pd') and an alternative map, which relate to the Pd'.

$$Pd' = \int |Pf - Pc| \cdot dt = \int (Pd) \cdot dt$$

An integral interval in integrating the difference Pd may be a computing interval ta for computing the integral value of the difference since a start time t1 of a thermal energy stabilization condition (i.e., a start time t1, at which the thermal energy is stabilized). The start time t1 of the thermal energy stabilization condition may be defined as a time, for example, at which the exhaust gas temperature Te exceeds the reference temperature Ts.

At step S107, the difference Pd (or integral value Pd') is compared with the deterioration determining value Ps (or Ps'). When the difference Pd (or integral value Pd') is equal to or larger than the deterioration determining value Ps (or Ps'), it is determined that the deterioration progresses to a certain degree, at which repair/replacement of the exhaust gas sensor 14 is required. Then, the process proceeds to step S108 and the warning arrangement 22 indicates the warning to warn the driver of the deterioration of the exhaust gas sensor 14. Also, this deterioration information is stored in a rewritable non-volatile memory.

In contrast, when the difference Pd (or integral value Pd') is less than the deterioration determining value Ps (or Ps'), it is determined that the deterioration does not progress very much and that an air-fuel ratio feed back control based on an output from the exhaust gas sensor 14 can be effectively performed. Thus, at step S109, the degree D of the deterioration based on the present difference Pd is computed by use of a map or a function f(Pd), which compute the degree D of the deterioration with an argument of the difference Pd. Similarly, the degree D of the deterioration based on the present integral value Pd' may be alternatively computed by use of an alternative map or an alternative function f'(Pd') with the argument of the integral value Pd'.

Figure 8:
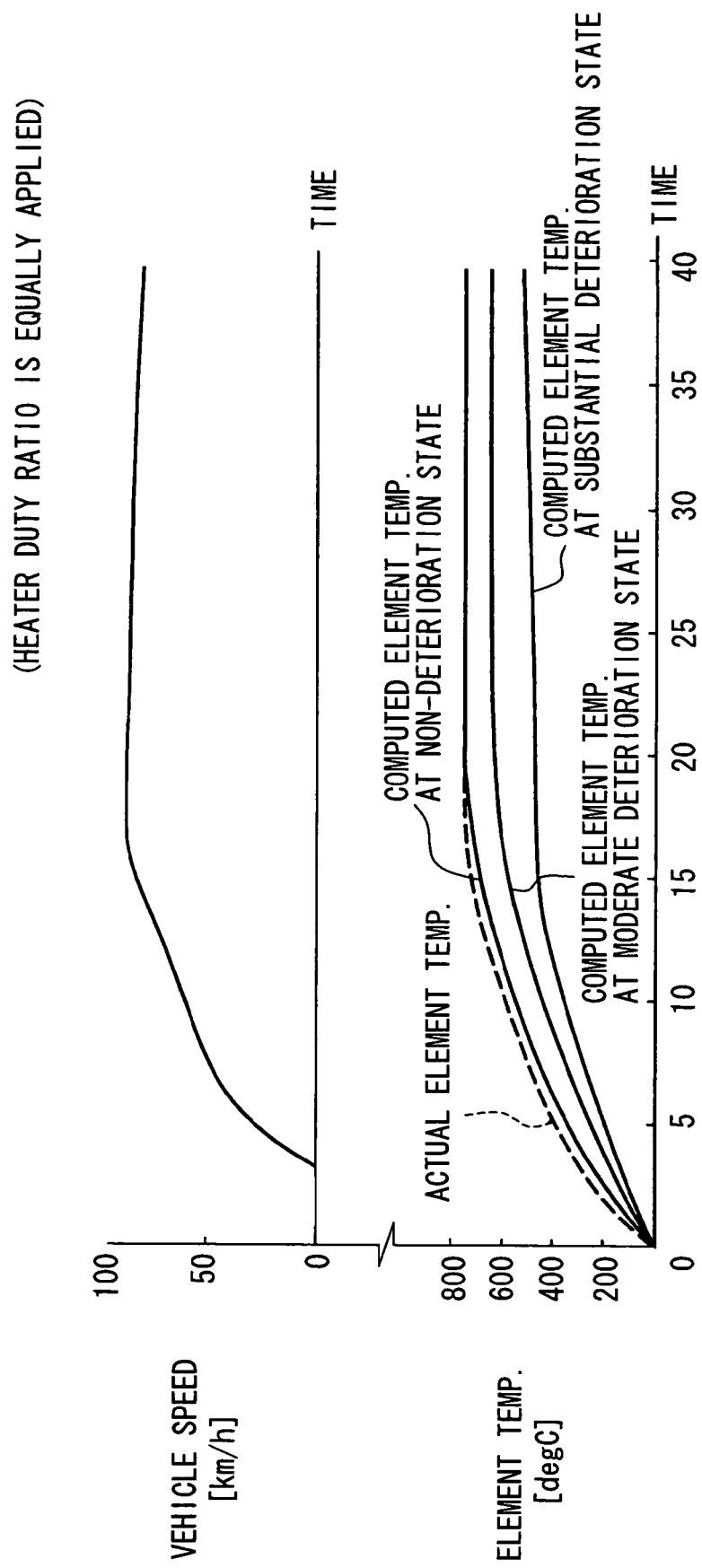
FIG. 8 is a time chart showing a relationship between the element temperature computed based on the element impedance and a degree of the deterioration of the exhaust gas sensor.

As shown in FIG. 2, as the deterioration of the exhaust gas sensor 14 progresses, the element impedance becomes larger. This result in that as the deterioration of the exhaust gas sensor 14 progresses, the computed (theoretical) element temperature (the second element temperature parameter Pc) computed based on the element impedance becomes lower. Therefore, as shown in FIG. 8, the difference (Pd) between an actual element temperature (the first element temperature parameter Pf) and the computed element temperature (the second element temperature parameter Pc) becomes accordingly to the degree of deterioration in a state where the heater duty ratio DUTY is equally applied. In consideration of this characteristic, the map or the function f(Pd) for computing the degree of the deterioration is set such that the degree D of the deterioration is computed larger when the difference Pd between the first element temperature parameter Pf and the second element temperature parameter Pc becomes larger.

After the degree D of the deterioration is computed, the process proceeds to step S110. At step S110, a heater current correction coefficient K is computed based on the present degree D of the deterioration by use of a map or a function f(D) with the argument of the degree D. Then, the heater duty ratio DUTY, which is set by the heater energization controlling arrangement 17, is reduced as correction by use of the heater current correction coefficient K such that the heater current (heating power) is reduced correspondingly to the present degree D of the deterioration. In this way, as the degree D of the deterioration of the exhaust gas sensor 14 becomes larger, the heater current (heating power) is correspondingly reduced such that over rising of the temperature of the sensor element 26 can be limited by control. As a result, the deterioration progression due to the overheat of the sensor element 26 can be limited. This process of step S110 corresponds to a heater energization correcting means.

The process of above step S102 serves as an executing condition determining means that determines a condition, at which the deterioration determining process for the exhaust gas sensor 14 is executed. At step S102, it is determined whether the thermal energy around the sensor element 26 is stabilized or not based on the exhaust gas temperature Te. However, alternatively, it may be determined whether the thermal energy around the sensor element 26 is stabilized or not based on an operational state of the internal combustion engine, such as one of the followings. For example, the first element temperature parameter Pf (the first sensor characteristic parameter), the element impedance, the second element temperature parameter Pc (the second sensor characteristic parameter), an elapsed time since time of starting the engine, a coolant temperature, the engine operational state (a steady state/a transient state) and a fuel-cut operational state (a fuel-cut operation is performed/the fuel-cut operation is not performed). When the first element temperature parameter Pf is computed in a state where the thermal energy around the sensor element 26 is stabilized, the first element temperature parameter Pf can be computed in a state where the interchange state of the thermal energy can be accurately estimated. Therefore, the degrees of accuracy in computing the first element temperature parameter Pf and also in determining the degree D of the deterioration can be improved.

In the above embodiment, the first element temperature parameter Pf is computed by use of the element temperature estimating model that considers the interchange state of the thermal energy (both the heat absorption and the heat emission) between the sensor element 26 and the periphery thereof. Thus, the first element temperature parameter Pf can be accurately computed.

Then, the degree D of the deterioration is determined based on the comparison between thus accurately computed first element temperature parameter Pf and the second element temperature parameter Pc, which is computed based on the element impedance. Thus, the degree D of the deterioration of the exhaust gas sensor 14 can be accurately determined.

In the present embodiment, the degree D of the deterioration of the exhaust gas sensor 14 is computed based on the difference Pd between the first element temperature parameter Pf and the second element temperature parameter Pc. However, a ratio between the first element temperature parameter Pf and the second element temperature parameter Pc can be alternatively used to compute the degree D of the deterioration of the exhaust gas sensor 14. In other words, the degree D of the deterioration of the exhaust gas sensor 14 may be alternatively computed based on any computed value as long as the any computed value evaluates (corresponds to) the difference between the first element temperature parameter Pf and the second element temperature parameter Pc.

Each of the first element temperature parameter Pf (the first sensor characteristic parameter) and the second element temperature parameter Pc (the second sensor characteristic parameter) is not limited to the estimated value of the element temperature. However, parameters, which are correlative to the element temperature or the element impedance, may be alternatively used.

Additional advantages and modifications will readily occur to those skilled in the art. The invention in its broader terms is therefore not limited to the specific details, representative apparatus, and illustrative examples shown and described.

What is claimed is:

1. A deterioration detecting apparatus for an exhaust gas sensor of an internal combustion engine, the exhaust gas sensor including a sensor element and a heater that heats the sensor element, the deterioration detecting apparatus comprising:

a first parameter computing means for computing a first sensor characteristic parameter, which is related to a characteristic of the sensor element, by estimating an interchange state of thermal energy between the sensor element and a periphery of the sensor element;

an element impedance sensing means for sensing impedance of the sensor element;

a second parameter computing means for computing a second sensor characteristic parameter, which is related to the characteristic of the sensor element, based on the impedance sensed by the element impedance sensing means; and a sensor deterioration determining means for determining a degree of deterioration of the exhaust gas sensor by comparing the first sensor characteristic parameter and the second sensor characteristic parameter.

2. The deterioration detecting apparatus according to claim 1, wherein the first parameter computing means computes the first sensor characteristic parameter in consideration of the followings:
heat absorption from exhaust gas to the sensor element;
heat emission from the sensor element to exterior of the sensor element; and
heating the sensor element by the heater.

3. The deterioration detecting apparatus according to claim 1, wherein each of the first and second sensor characteristic parameters includes a temperature of the sensor element or a parameter that relates the temperature of the sensor element.

4. The deterioration detecting apparatus according to claim 1, further comprising an executing condition determining means for allowing the first parameter computing means to compute the first sensor characteristic parameter when the thermal energy around the sensor element is stabilized.

5. The deterioration detecting apparatus according to claim 4, wherein the executing condition determining means determines whether the thermal energy around the sensor element is stabilized based on an operational state of the internal combustion engine.

6. The deterioration detecting apparatus according to claim 4, wherein the executing condition determining means determines whether the thermal energy around the sensor element is stabilized based on at least one of the followings:
the first sensor characteristic parameter;
the impedance of the sensor element;
the second sensor characteristic parameter;
an elapsed time since a time of staring the internal combustion engine;
a temperature of a coolant;
a determination result of determining whether the internal combustion engine is operated under a steady state or a transient state; and
a determination result of determining whether a fuel-cut operation is performed.

7. The deterioration detecting apparatus according to claim 1, further comprising a heater energization correcting means for correcting an energizing amount for energizing the heater based on the degree of the deterioration of the exhaust gas sensor, which is determined by the sensor deterioration determining means.

8. The deterioration detecting apparatus according to clam 1, further comprising a warning means for giving a warning when the degree of the deterioration of the exhaust gas sensor, which is determined by the sensor deterioration determining means, is equal to or more than a deterioration determining value.

9. The deterioration detecting apparatus according to clam 1, wherein the sensor element is used to detect a concentration of a gas component of exhaust gas of the internal combustion engine.

10. The deterioration detecting apparatus according to clam 9, wherein the concentration of the gas component of the exhaust gas includes a concentration of oxygen of the exhaust gas.

11. The deterioration detecting apparatus according to clam 1, wherein the sensor element is used to detect an air-fuel ratio.

12. The deterioration detecting apparatus according to clam 1, wherein the sensor element is used to detect whether an air-fuel mixture condition is rich or lean.

13. A detecting method for detecting deterioration of an exhaust gas sensor of an internal combustion engine, the exhaust gas sensor including a sensor element and a heater that heats the sensor element, the detecting method comprising:
computing a first sensor characteristic parameter, which is related to a characteristic of the sensor element, by estimating an interchange state of thermal energy between the sensor element and a periphery of the sensor element;
sensing impedance of the sensor element;
computing a second sensor characteristic parameter, which is related to the characteristic of the sensor element, based on the impedance sensed by the sensing of the impedance; and
determining a degree of deterioration of the exhaust gas sensor by comparing the first sensor characteristic parameter and the second sensor characteristic parameter.

14. The detecting method according to claim 13, wherein the computing of the first sensor characteristic parameter includes computing the first sensor characteristic parameter in consideration of the followings:
heat absorption from exhaust gas to the sensor element;
heat emission from the sensor element to exterior of the sensor element; and
heating the sensor element by the heater.

15. The detecting method according to claim 13, wherein each of the first and second sensor characteristic parameters includes a temperature of the sensor element or a parameter that relates the temperature of the sensor element.

16. The detecting method according to claim 13, further comprising allowing the computing of the first sensor characteristic parameter to compute the first sensor characteristic parameter when the thermal energy around the sensor element is stabilized.

17. The detecting method according to claim 16, wherein the allowing of the computing of the first sensor characteristic parameter includes determining whether the thermal energy around the sensor element is stabilized based on an operational state of the internal combustion engine.

18. The detecting method according to claim 16, wherein the allowing of the computing of the first sensor characteristic parameter includes determining whether the thermal energy around the sensor element is stabilized based on at least one of the followings:
the first sensor characteristic parameter;
the impedance of the sensor element;
the second sensor characteristic parameter;
an elapsed time since a time of staring the internal combustion engine;
a temperature of a coolant;
a determination result of determining whether the internal combustion engine is operated under a steady state or a transient state; and
a determination result of determining whether a fuel-cut operation is performed.

19. The detecting method according to claim 13, further comprising correcting an energizing amount for energizing the heater based on the degree of the deterioration of the exhaust gas sensor, which is determined by the determining of the degree of the deterioration.

20. The detecting method according to claim 13, further comprising giving a warning when the degree of the deterioration of the exhaust gas sensor, which is determined by the determining of the degree of the deterioration, is equal to or more than a deterioration determining value.

21. The detecting method according to claim 13, wherein the sensor element is used to detect a concentration of a gas component of exhaust gas of the internal combustion engine.

22. The detecting method according to claim 21, wherein the concentration of the gas component of the exhaust gas includes a concentration of oxygen of the exhaust gas.

23. The detecting method according to claim 13, wherein the sensor element is used to detect an air-fuel ratio.

24. The detecting method according to claim 13, wherein the sensor element is used to detect whether an air-fuel mixture condition is rich or lean.

* * * * *